March 16, 1943.  L. P. GROBEL  2,314,207

SHAFT SEAL

Filed Dec. 30, 1941

Inventor:
Lloyd P. Grobel,
by Harry E. Dunham
His Attorney.

Patented Mar. 16, 1943

2,314,207

UNITED STATES PATENT OFFICE 2,314,207

SHAFT SEAL

Lloyd P. Grobel, Schenectady, N. Y., assignor to General Electric Company, a corporation of New York Application December 30, 1941, Serial No. 424,899

1 Claim. (Cl. 286—9)

My invention relates to shaft seals and particularly to liquid film seals used for preventing the escape of gas between a shaft and its enclosing casing.

In gas cooled dynamo-electric machines, an enclosing casing is provided which is filled with a ventilating gas such as hydrogen, which is circulated in the casing and through the machine to ventilate the various windings and parts of the machine. Openings are arranged in the ends of the enclosing casing of the shaft of the machine, and bearings are arranged adjacent the ends of the enclosing casing to support the shaft and a rotatable member of the machine. In order to prevent the loss of ventilating gas from the enclosing casing by leakage into the surrounding atmosphere and to prevent the contamination of the ventilating gas in the enclosing casing by leakage of air thereinto, a seal is provided between the shaft and the enclosing casing adjacent each of the openings.

An object of my invention is to provide an improved shaft seal of the liquid film type.

Another object of my invention is to provide an improved seal of the liquid film type for gas filled dynamo-electric machines for minimizing the flow of the sealing liquid required to provide the seal.

Further objects and advantages of my invention will become apparent and my invention will be better understood from the following description referring to the accompanying drawing, and the features of novelty which characterize my invention will be pointed out with particularity in the claim annexed to and forming part of this specification.

Figure 1:
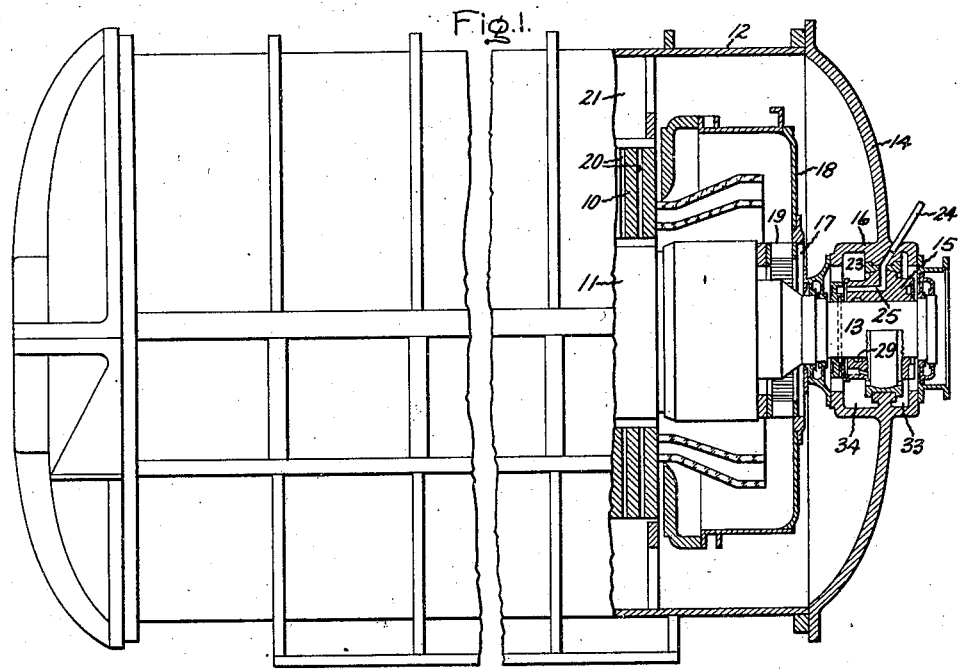
Figure 2:
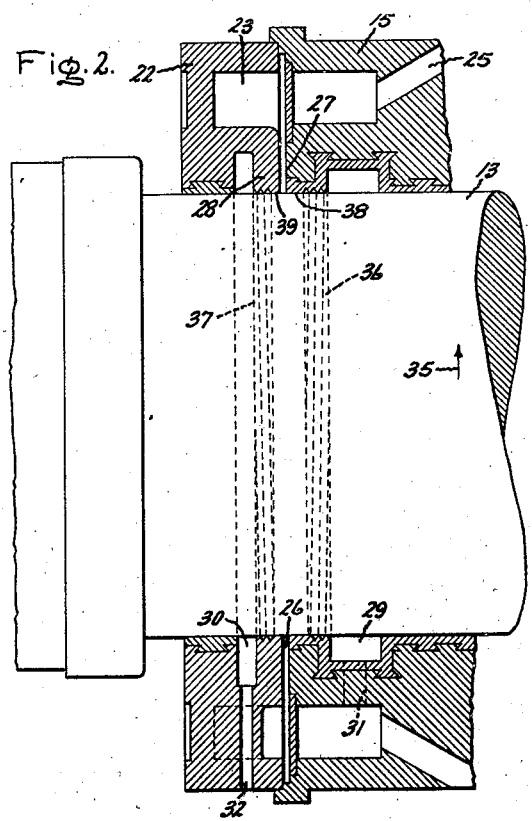

In the drawing, Fig. 1 is a side elevational view, partly broken away, of a dynamo-electric machine provided with my improved liquid film seal; and Fig. 2 is an enlarged view, partly in section of the shaft and shaft seal shown in Fig. 1.

Referring to the drawing, I have shown a dynamo-electric machine including a stationary member 10 and a rotatable member 11 provided with an enclosing casing 12 filled with a ventilating gas other than air, such as hydrogen. The rotatable member 11 is mounted on a shaft 13 which extends through end walls 14 of the enclosing casing 12. The shaft 13 is supported in bearings 15 mounted in bearing housings 16 carried by end walls 14 of the machine casing.

In order to ventilate and cool the dynamo-electric machine effectively, the ventilating gas within the enclosing casing 12 is circulated therein and through the various windings and parts of the machine and gas coolers. This gas is drawn from the end of the enclosing casing 12 through an opening 17 provided in the end of a fan casing 18 surrounding a fan 19 carried by the rotatable member 11, and the gas is discharged into the air gap between the stationary member 10 and the rotatable member 11 of the dynamo-electric machine and into other axial ventilating passages. The ventilating gas then flows outwardly through a plurality of radially disposed or outwardly extending ducts 20 arranged between groups of laminations of the stationary member 10 and into a plurality of passages 21 extending between the ends of the enclosing casing 12 and the stationary member 10.

A shaft sealing member is provided for the rotatable shaft 13 which includes an annular sealing ring member 22 secured to the bearing 15. This annular sealing member 22 is formed with an annular chamber or reservoir 23 for supplying sealing liquid under pressure to a fluid or liquid seal. This sealing liquid is supplied to the annular chamber 23 from a pressure reservoir by a supply pipe 24 and through a connecting passage 25 formed in the bearing housing 16 and the bearing 15. This connecting passage 25 extends into communication with the annular chamber 23 and the sealing liquid passes from the chamber 23 into a relatively narrow sealing liquid supply chamber 26 formed with a wall on each side thereof which includes a wall 27 which forms part of the bearing 15 and a wall 28 which forms part of the annular sealing member 22. On the outer side of each of these walls 27 and 28 is formed a collecting passage 29 and 30, respectively, into which sealing liquid is adapted to be collected when it passes between sealing surfaces of the chamber walls extending about the shaft 13. Each of these chambers is provided with a drain passage 31 and 32 which lead into sumps 33 and 34, respectively, from which the sealing liquid is drained, cooled, and recirculated.

It is desirable that the amount of sealing liquid passing through the seal should be as small as possible in order to minimize the treatment of the sealing liquid before it is recirculated through the seal. In most large dynamo-electric machines such as the one illustrated, the rotatable member 11, including the shaft 13, is adapted to rotate only in a predetermined direction. In the illustrated arrangement, this is indicated by the arrow 35. The flow of sealing liquid from the sealing liquid pressure chamber 26 is minimized by providing spiral grooves 36 and 37 in the sealing surface of the walls 27 and 28, respectively. These spiral grooves extend in opposite directions in the two wall sealing surfaces and in a sense such that the rotation of the shaft in its predetermined direction tends to create a fluid or liquid pressure on the sealing liquid through the spiral grooves which is opposed to the pressure of the sealing fluid in the supply chamber 26. By properly proportioning these spiral grooves and providing them with the proper pitch, the back pressure towards the feeding chamber on each side thereof created by rotation of the shaft 13 in the liquid in these grooves may be made such that a very minimum amount of liquid passes along the shaft in opposite directions into the collecting chambers 29 and 30 to assure the proper operation of the seal. A small clearance seal is formed by ungrooved portions 38 and 39 in the walls 27 and 28, respectively, adjacent the sealing liquid supply chamber 26.

While I have illustrated and described a particular embodiment of my invention, modifications thereof will occur to those skilled in the art. I desire it to be understood, therefore, that my invention is not to be limited to the particular arrangement disclosed, and I intend in the appended claim to cover all modifications which do not depart from the spirit and scope of my invention.

What I claim as new and desire to secure by Letters Patent of the United States is:

A shaft seal for a rotatable shaft arranged to rotate in a predetermined direction including means having a sealing liquid chamber about said shaft with a sealing wall on each side of said chamber for feeding sealing liquid in both directions along said shaft, means for supplying sealing liquid under pressure to said chamber, said chamber walls each having a sealing surface extending about said shaft with a spiral groove therein, said spiral grooves being in opposite directions in said two wall sealing surfaces and in a sense such that rotation of said shaft in said predetermined direction tends to create a liquid pressure on the sealing liquid through said spiral grooves for minimizing the flow of sealing liquid from said chamber, a sealing liquid collecting passage on the outer side of each of said spiral grooves, an ungrooved bearing section on the outer side of each of said collecting passages, and an ungrooved sealing surface on each of said chamber walls about said shaft adjacent said chamber.

LLOYD P. GROBEL.